Patented Mar. 16, 1926.

1,577,200

UNITED STATES PATENT OFFICE.

CLYDE L. VORESS, OF CHARLESTON, WEST VIRGINIA, VERNON C. CANTER, OF TULSA, OKLAHOMA, AND ROBERT W. SKOOG, OF CHARLESTON, WEST VIRGINIA, ASSIGNORS TO GASOLINE RECOVERY CORPORATION, A CORPORATION OF DELAWARE.

ABSORPTION APPARATUS.

Application filed August 3, 1925. Serial No. 47,856.

*To all whom it may concern:*

Be it known that we, CLYDE L. VORESS, VERNON C. CANTER, and ROBERT W. SKOOG, citizens of the United States, residing at Charleston, county of Kanawha, State of West Virginia, at Tulsa, county of Tulsa, State of Oklahoma, and at Charleston, in the county of Kanawha and State of West Virginia, respectively, have invented certain new and useful Improvements in Absorption Apparatus; and we do hereby declare the following to be a full, clear, and exact description of the invention, such as will enable others skilled in the art to which it appertains to make and use the same.

This invention relates to an improved apparatus and equipment for use especially in the art of vapor recovery. More especially it relates to a novel type absorption apparatus, and to a specific arrangement of such absorption apparatus.

In the industry of recovery of vapors from gaseous mixtures certain disadvantages of apparatus are known which we overcome by the improved apparatus hereinafter described. In apparatus as set forth in United States Patent No. 1,402,340 referring specifically to the absorbing tower there described, difficulty is experienced in retaining the absorbent material within the tower under large flow of gaseous mixtures through the same. Further under such conditions the absorbent material quickly disintegrates to dust and is therefore lost. Under conditions of pressure usually found in the industry, it is not commercially feasible to greatly increase the diameter of a vertical tower. We have conceived a new and improved apparatus which allows an unlimited expansion of the cross section of the bed of the absorbent independent of the pressure or great volumes of flow of gaseous mixtures to be treated. Coincidentally there is obtained uniform distribution of flow through the bed of absorbent not attainable in that type of apparatus described in United States Patent No. 1,429,856.

In the accompanying drawing.

Figure 1:
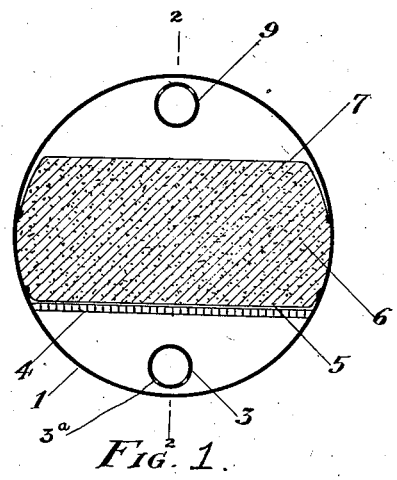
Fig. 1 is a transverse vertical sectional view of the apparatus taken on line 1—1 of Fig. 2.
Figure 2:
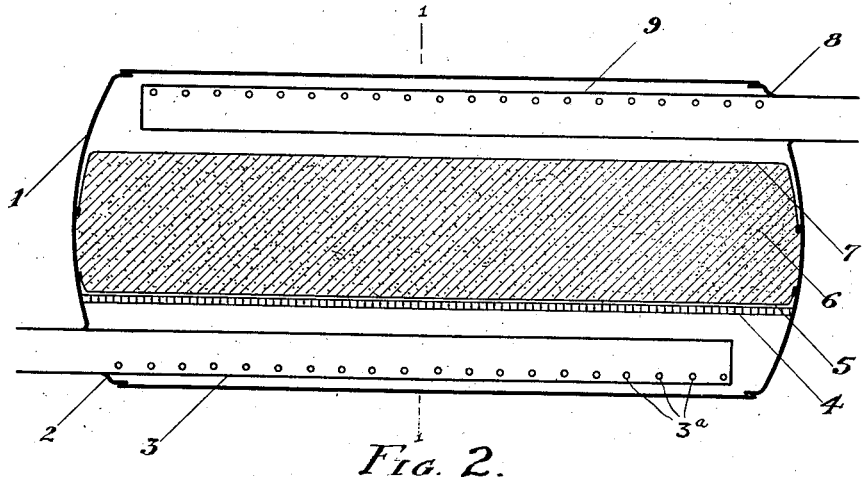
Fig. 2 is a longitudinal sectional view taken on line 2—2 of Fig. 1.

Referring to the drawing, 1 is a vessel of any suitable material, of any desired size and shape but preferably cylindrical, placed in a horizontal position with respect to the earth's plane. Through inlet or outlet port 2 there passes a tube 3 of any suitable material. The port is entirely closed around the tube by either welding or other means of connection to prevent leakage. The said tube has suitable apertures 3ᵃ opening within the vessel or drum at such desired points as to permit the exit or entrance of gases and vapors in such a way that they will not disturb or damage the solid absorbent with which the horizontal central portion of the drum is packed. A grating 4 of such material and mechanical structure as may be necessary is placed to bear the weight that is to be imposed upon it. Immediately on top of the grating is placed a suitable screen 5 of porous inert material in such a way that the solid absorbent to be placed thereon will not appreciably sift through, but porous enough to permit free flow therethrough of gases, liquids and vapors. A mass 6 of granular solid porous absorbent such as activated charcoal, iron gel, silica gel, etc., rests upon the screen and grating at the bottom. On top of the porous absorbent rests a screen or body of foraminous material 7 securely attached to the side walls in such a way as to substantially prevent any of the solid absorbent from passing upward. Through a second port 8 in the drum, preferably at the opposite end thereof, there passes a second tube 9. This tube is also apertured in such a way that gases, vapors or liquids entering through it will not disturb or damage the solid absorbent below. The port where it enters the drum is also securely closed around the tube either by welding or other suitable means. We are aware that tube 9 may equally as well enter in the opposite end. At convenient points in the shell, openings with removable covers can be provided to allow entrance and exit in course of construction.

This apparatus is characterized by these particular points:

First. The drum lies in a horizontal position giving the maker latitude in increasing or decreasing the length so that it will contain the necessary amount of absorbent material relative to the base surface through which the gases to be contacted with the absorbent must pass.

Second. The depth of the layer of solid absorbent may also be easily increased or decreased to assist in securing the proper ratio of base surface to the amount of gas to be contacted with the absorbent.

Third. The apertured disseminator at the bottom if used as the inlet, has its openings arranged to direct the gas downwardly so as not to form a gas blast against the absorbent material thereby mechanically wearing it away.

Fourth. The grating 4 is added to give mechanical strength for the support of the absorbent material. It is not of such close construction as would prevent the absorbent material from falling through if it were not for the screen placed thereon.

Fifth. The screen placed on the grating need not have great mechanical strength since the grating supports the screen at short intervals of space. The screen would not have sufficient mechanical strength to maintain the weight of the absorbent if it were not for the grating.

Sixth. Both the screen and grating are of such material and construction that substantially no resistance is offered to the flow of gases, liquids or vapors therethrough.

Seventh. The screen placed above the absorbent is fastened at the edges and arranged so that it can either expand or settle with the absorbent material. Its purpose is to prevent absorbent material from being blown from the bed through the upper apertured disseminator and lost, and also to prevent an uneven surface from forming in the absorbent material. If desired, weights may be placed on top of the screen.

Eighth. The upper apertured disseminator is arranged in a similar way to the lower apertured disseminator, so that gas or liquid being passed through it will not strike the absorbent with a blast and tend to disturb the surface or crush and grind the absorbent material.

An apparatus for carrying out a continuous process of vapor recovery is described in Patent No. 1,402,340, wherein three such vessels of the type described herein can readily be used.

We are well aware that the two apertured disseminators might both enter from the same end, or that a multiplicity of disseminators might be used without departing from the spirit of this invention. We are also aware that the platform upon which the solid absorbent rests might be made in one piece rather than a grating and screen, by using and supporting some material having sufficiently small holes to prevent passage of appreciable quantities of the solid absorbent therethrough.

The advantages of such an apparatus are obvious and are believed novel in so far as a new type of absorber is included in the system.

What we claim and desire to secure by Letters Patent is:—

1. An apparatus consisting of a horizontally disposed drum having an apertured disseminator arranged in the lower portion of the same near the bottom and extending along the lower part of the drum for substantially the entire length of the latter, a mechanical support in the drum rigidly secured to the latter slightly above the said disseminator, substantially stationary solid absorbent material carried by the support, a second mechanical support between the absorbent material and first mentioned support and having openings sufficiently small to prevent particles of the solid absorbent material from passing therethrough, and a second apertured disseminator extending along the upper portion of the drum above the solid absorbent.

2. An apparatus consisting of a horizontally disposed drum of suitable material containing a body of solid absorbent material and having two apertured disseminators entering from the outside and extending along the interior of the drum for substantially the entire length of the latter, one in the upper portion and the other in the lower portion, said apertures being so arranged that gas passing through the lower disseminator will be directed downwardly while gas passing through the upper disseminator will be directed upwardly.

3. An apparatus consisting of a cylindrical drum placed horizontally with respect to the earth's plane and having parallel conduits entering at either end and extending for substantially the entire length of the apparatus, one near the bottom and the other near the top, said conduits having openings therein to permit gases, vapors, or liquids to enter and leave said apparatus, a bed of solid absorbent placed between said conduits and resting upon suitable mechanical supports fixed above the lower conduit and held in place from above by suitable mechanical means.

4. An apparatus consisting of a horizontally disposed cylindrical drum having a supporting screen, solid absorbent resting upon the supporting screen, a screen secured by mechanical means to the drum and arranged above the absorbent, conduits entering the lower and upper portions of said drum and extending one under and one over the solid absorbent, said conduits having openings therein so arranged that gases, vapors and liquids when passing through the openings in the lower conduit will be directed downwardly and when passing through the openings in the upper conduit will be directed upwardly and will not directly impinge upon the solid absorbent in the said drum.

5. An apparatus consisting of a horizontally disposed shell having an internal platform containing small apertures to permit passage of gases therethrough, and securely fastened to said shell, a bed of granular solid absorbent material resting on said platform, a perforated screen between the platform and absorbent material of a mesh sufficiently small to prevent the absorbent from sifting through the same, a second perforated screen securely fastened to the walls of said shell and resting on top of said solid absorbent, and apertured disseminators placed in said shell and extending from the outside both under and above said bed of solid absorbent for substantially the entire length of the latter.

6. An apparatus consisting of a horizontal shell having an internal platform near the bottom and attached to the walls of the shell, said platform having holes of any desired size therethrough, a bed of granular solid absorbent resting on said platform, a perforated member resting on said absorbent and fastened to the shell in such a way that it may rise or fall with the absorbent as the latter expands or contracts, an apertured disseminator arranged in the lower portion of the shell and extending along substantially the entire length thereof under the absorbent bed, and a second apertured disseminator entering the shell and extending along substantially the entire length of the shell above the absorbent.

7. An apparatus consisting of a horizontal shell having an internal apertured platform near the bottom and attached to the walls of the shell, a bed of granular solid absorbent resting on said platform, a perforated member resting on said absorbent and fastened to the shell in such a way that it may rise or fall with the absorbent as the latter expands or contacts, an apertured conduit entering through a port in one end of the shell and extending substantially the length thereof below the absorbent, the apertures in the conduit being so arranged that gases passing in a straight line therethrough will be directed downwardly away from the solid absorbent, and an apertured conduit entering the other end of said apparatus through a port and extending substantially the length thereof above the absorbent, the apertures in the last named conduit being so arranged that gases passing in a straight line therethrough will be directed upwardly away from the solid absorbent.

In testimony whereof we affix our signatures.

CLYDE L. VORESS.
ROBERT W. SKOOG.
VERNON C. CANTER.